United States Patent [19]

Sekimoto et al.

[11] Patent Number: 4,805,299
[45] Date of Patent: Feb. 21, 1989

[54] WORKING APPARATUS FOR USE IN AN ASSEMBLING/PROCESSING LINE

[75] Inventors: Isao Sekimoto; Isoroku Mihara; Shigeo Ueda; Shinichi Yasui; Shunso Wakaoka, all of Hiroshima; Kyoji Hida, Aichi, all of Japan

[73] Assignee: Mazda Motor Corporation, Hiroshima, Japan

[21] Appl. No.: 139,353

[22] Filed: Dec. 29, 1987

[30] Foreign Application Priority Data

Dec. 29, 1986 [JP] Japan .................................. 61-310934
Dec. 29, 1986 [JP] Japan .................................. 61-310935
Dec. 29, 1986 [JP] Japan .................................. 61-310936
Dec. 29, 1986 [JP] Japan .................................. 61-310937

[51] Int. Cl.4 ............................................. B23P 19/00
[52] U.S. Cl. ......................................... 29/796; 29/799; 29/715; 29/823
[58] Field of Search ................. 29/715, 714, 712, 718, 29/711, 796, 799, 823, 713, 564.1, 564.2, 564.7, 700, 795, 797; 72/451

[56] References Cited

U.S. PATENT DOCUMENTS 4,673,075  6/1987  Ueyama et al. .................. 29/799 X

FOREIGN PATENT DOCUMENTS 52-21662  5/1977  Japan .

Primary Examiner—Mark Rosenbaum
Assistant Examiner—Joseph M. Gorski
Attorney, Agent, or Firm—Fleit, Jacobson, Cohn & Price

[57] ABSTRACT

A working apparatus for applying a working to a work placed on a pallet conveyed by a conveyer by staking a part of the work or fitting an element to work. The apparatus includes a working head vertically moved between a raised working position where the working head applies the working upon the work from beneath and a lowered rest position. A lifting device disposed beside the working head in the lowered rest position moves the working head up and down. An operating device is also disposed beside the working head in the lowered rest position. The operating device is displaced sideways to be brought into cooperation with the working head in the working position and operates the working head to apply the working to the work.

17 Claims, 14 Drawing Sheets

WORKING APPARATUS FOR USE IN AN ASSEMBLING/PROCESSING LINE

BACKGROUND OF THE INVENTION

The present invention relates to apparatus for use in a production line, and more particularly, but not exclusively, to an automatic working apparatus for applying a working upon a work from underneath by, for example, deforming a part of the work or fitting an element to the work.

In a production line, for example, in an automatic assembling line where vehicle parts are assembled, it has become increasingly popular to use working apparatus by which several workings are applied to a part or a sub-assembly of parts of a vehicle placed on a pallet and conveyed in series by means of a conveyer. In such a production line, it has heretofore been known to apply a working upon the part or sub-assembly from beneath by means of working apparatus having a vertically movable working head located below the conveyer. Such a working apparatus is disclosed in, for example, Japanese Utility Model Publication No. 52-21,662 published May 18, 1977, entitled "Automatic Fitting Apparatus."

The working apparatus taught by the Japanese Utility Model Publication consists of a working head and an operating device disposed below the working head, for causing the working head to perform the working upon the part or assembly placed on the pallet.

One disadvantage associated with known working apparatus of this type utilizing a vertically movable working head is the large headroom and space required to accommodate the working head and the operating device aligned vertically between the conveyer and the floor. Also, for a configuration as noted, it has been necessary for the conveyor to be installed at a raised position. Installing the conveyor at the raised position causes difficulties for operators due to the inaccessibility to works on the pallets conveyed by the conveyer.

OBJECT OF THE INVENTION

It is, therefore, an object of the present invention to provide a working apparatus which can be housed in a relatively small space with relatively low headroom to fit comfortably under a conveyer on which a work on a pallet is being conveyed and to provide excellent accessibility.

It is another object of the invention to provide a working apparatus which is flexible in its application to a variety of workings.

SUMMARY OF THE INVENTION

In accordance with the present invention, a novel working apparatus is provided that includes a working head vertically movable between a working position where performance of a working upon a work may be carried out and a rest position. The working apparatus is located beneath a production line conveyer and includes lifting means disposed beside a working head placed in the rest position for lifting the working head to the working position from the rest position, and driving or operating means disposed beside the working head placed in the rest position. The driving means is movable horizontally to a cooperative position where cooperating with the working head placed in the working position, the driving means operates the working head to perform the working upon a work on a pallet conveyed by the conveyer. The working head is slidable for vertical movement between the working and rest positions and supported by a swingable frame. This swingable frame is adapted to be swung by means of, for example, an electric motor, to place the working head in and out of the rest position from a remote position. When the working head is in the remote position, out of the rest position, the working head, if necessary, receives a part to be assembled to the work.

In accordance with a feature of a preferred embodiment of the present invention, the working head includes a supporting member movable vertically between the working an rest positions and a spindle rod which is mounted on the supporting member for vertical movement. The spindle rod is operated or driven directly by the operating means to move vertically upwardly. Either the supporting member or the spindle rod is provided at its top end with a special means suitable for performing an intended working, such as, staking a lock nut fastened to the work, thrusting and fitting a part to the work, or the like. For staking a lock nut, the special means comprises nipping means consisting of a fixed jaw and a swingable jaw with an edge. A space is formed between the fixed and swingable jaws to receive the lock nut fastened to the work. When the spindle rod is pushed up vertically by the operating means, the swingable jaw is swung to press strongly lip of the lock nut and to dent the lip on the lock nut fastened to the work, thereby staking the lock nut.

For fitting, for example, a hub cap into a hub of a brake drum of an axle assembly of a vehicle, the special means of the spindle rod comprises a hub cap receiving member with a center recess formed at its top for receiving a hub cap therein upside down. In this case, the hub cap is inserted (firmly fitted) into the hub of the brake drum as a result of a vertical movement of the spindle rod, also produced by the operating device.

In accordance with a feature of another preferred embodiment of the present invention the working head consists of a rotatable spindle rod and coupling means for rotationally coupling together the rotatable spindle rod and an operating means provided with a horizontal drive shaft. The rotatable spindle rod is formed at its top end with a center recess. For example, a screw cap is placed in the center recess and is fastened to a threaded part of work on a pallet being conveyed by a conveyer. As a result of the rotation of the rotatable spindle rod, produced by the drive shaft of the operating means, the screw cap is applied to a threaded part of the work.

In any case, two working heads which are either different or the same in construction and function may be attached to the swingable frame. If in fact two different working heads are attached to the swingable frame, two different workings, for example, fastening and staking a lock nut, can be applied to the same work at the same working station in the production line by alternately bringing these working heads from the remote position to the rest position where they are acted upon and cooperate with the operating means. On the other hand, if two working heads, which are the same in construction and function but different in size are attached to the swingable frame, a same working can be applied to two different sizes of works.

BRIEF DESCRIPTION OF THE DRAWINGS

These and other objects and features of the present invention will be apparent from the following description, reference being had to the accompanying drawings wherein preferred embodiments of the present invention are clearly shown and wherein.

DETAILED DESCRIPTION OF THE INVENTION

While the working apparatus of the present invention may be used in various workings such as crimping, denting, staking, caulking, fitting, fastening, or the like for fixing one part to another in an automatic production or assembling line, it will be specifically described in its application to assembling a rear axle assembly, in particular to deforming a lock nut, and/or fastening a hub cap or screw cap, of a rear axle assembly during assembly of same in a vehicle assembling line. Because rear axle assemblies of a vehicle and apparatus used in connection with the vehicle assembling line for handling/manipulating parts of a vehicle are, in general, well known in the art, the present description will be directed in particular to the components and elements forming part of, or cooperating directly with, working apparatus in accordance with the present invention. It is to be understood that components or elements not specifically shown or described can take various forms well known to those skilled in the vehicle assembling art.

Figure 1:
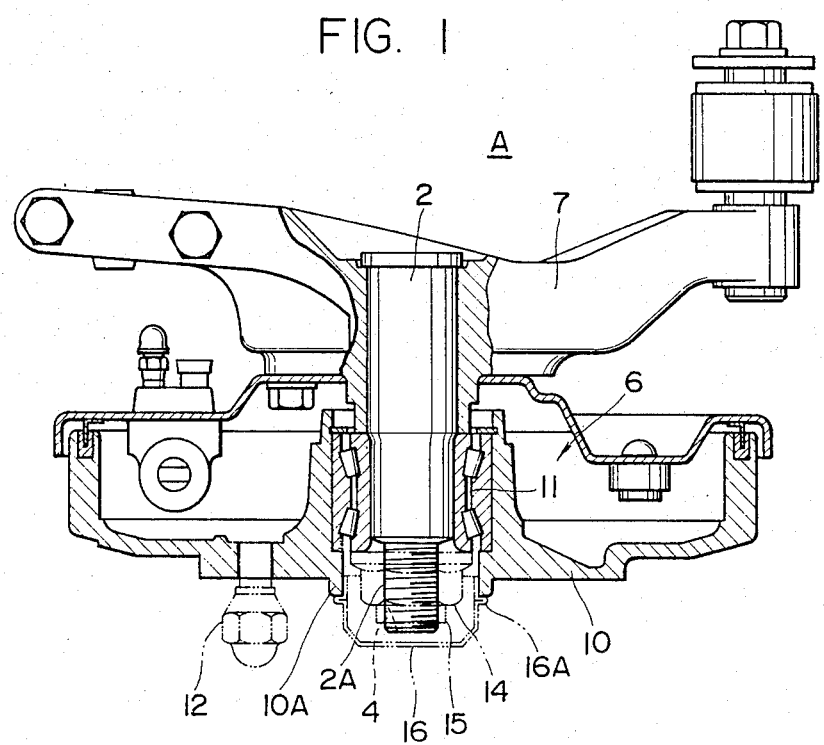
FIG. 1 is a side view, partly in cross section, showing a rear axle assembly for a vehicle.
Figure 2:
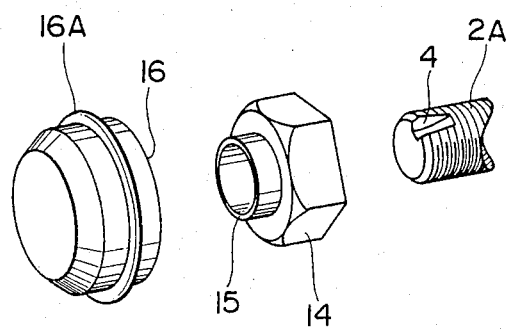
FIG. 2 is a perspective illustration showing a lock nut and a hub cap for fixing a brake drum to a brake assembly by the use of the working apparatus according to the present invention.

Referring now to the drawings wherein like reference characters designate corresponding elements, parts, or sections throughout several views, a preferred embodiment will be now described. FIG. 1 shows a completed rear axle assembly A lying with its outside facing down. The assembly A includes a spindle 2 supported by a knuckle 7 with a wheel brake unit 6 bolted to the knuckle 7. The brake unit 6 consists of a brake drum 10 having an annular hub 10A extending or projecting outwardly mounted on the spindle 2 through a bearing 11. As is well known in the art, a wheel (not shown) is firmly bolted to the brake drum 10 by means of wheel lugs 12 (one of which is shown in FIG. 1). The spindle 2 has at its outer end portion (the lowest point in the drawing) a threaded area 2A defining an axially extending tapered cut groove or kerf 4 formed in its outer periphery, see FIG. 2, with the deepest part of groove 4 being at the end of the threaded area 2A. A lock nut 14 with an annular thin skirt or lip 15, see FIG. 2, formed on its outer end surface is threadingly engaged on threaded area 2A and then staked or crimped in position by deforming or denting the thin skirt lip 15 on the lock nut 14 to deform or dent it to fit into groove 4 to prevent rotation of lock nut 14 and thereby fasten the brake drum 10 in order to prevent it from falling out from the spindle 2. After the staking of the lock nut 14, a hub cap 16 with an annular collar 16A illustrated in FIG. 2 is press fitted into the central opening of the annular hub 10A of the brake drum 10.

Figure 3A:
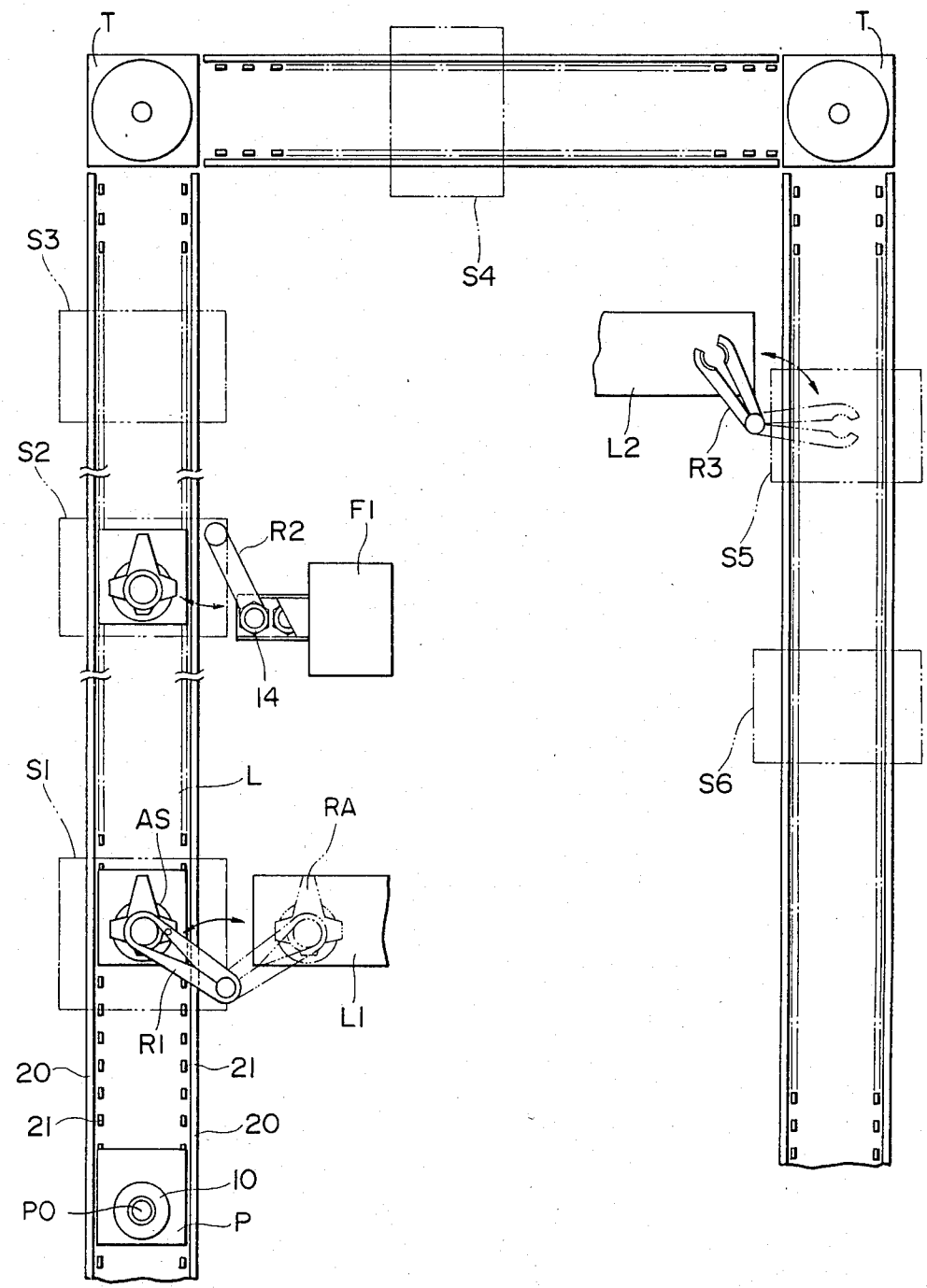
FIG. 3(A) is a plan view schematically showing an automatic rear axle assembling line in which the working apparatus of the present invention is used.
Figure 3B:
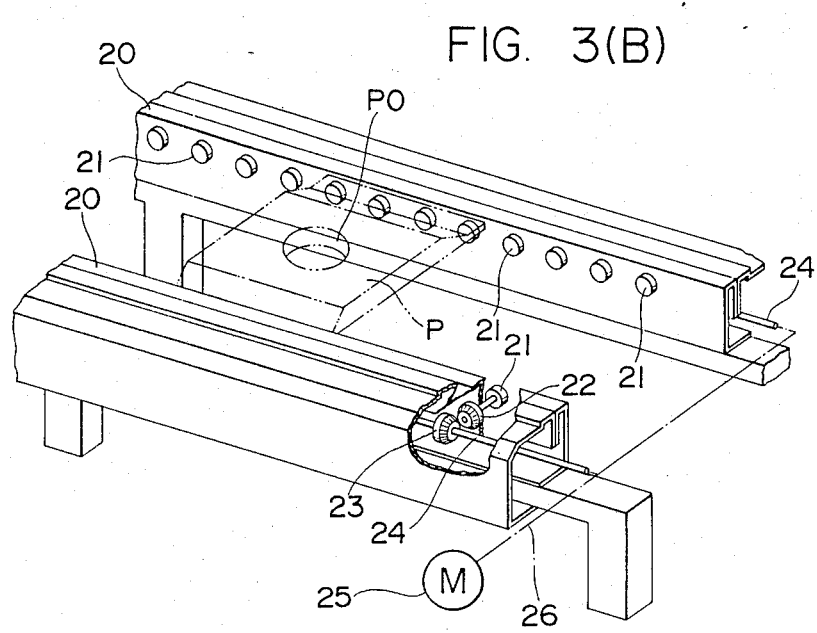
FIG. 3(B) is a perspective view, partly broken away, showing a part of a conveyer of the automatic rear axle assembling line of FIG. 3(A)
Figure 11:
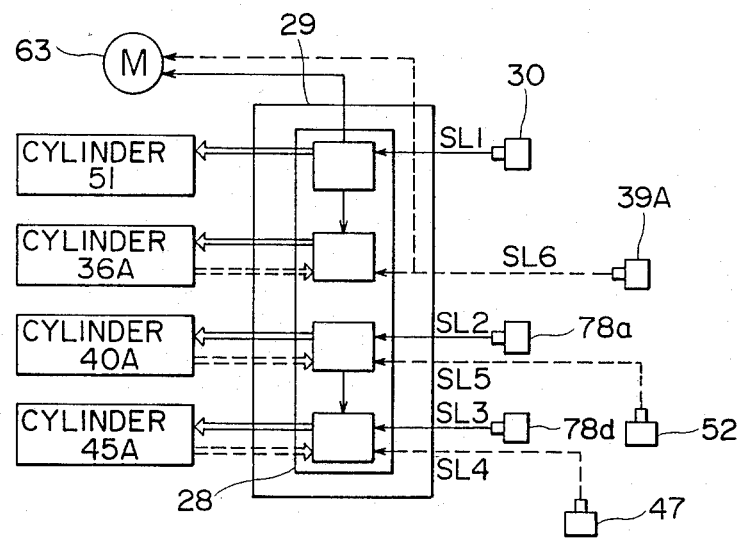
FIG. 11 is a block or schematic diagram showing a controlling system for various cylinders used in the working apparatus of FIG. 4.

Referring now to FIGS. 3(A) and (B), an automatic rear axle assembling line is fragmentarily illustrated. As shown, the assembling line includes a main-conveyer L for conveying rear axle sub-assemblies AS placed on pallets P formed with a center opening PO which allows easy access to the rear axle sub-assembly AS. The main-conveyer L comprises three sections arranged in a U configuration, each section consists of a pair of rails 20 extending horizontally and in parallel. Inside rails 20 on the opposed facing vertical surfaces below the top of rails 20 are series of friction rollers 21 with rollers 21 mounted at regular or equal intervals or spacings. Each roller 21 is coupled by a shaft to a driven bevel gear 22 in mesh with a driving bevel gear 23. The driving bevel gears 23 are fixed on a common drive shaft 24 (one for each series of rollers 21). Each common drive shaft 24 is driven by an electric motor 25 through a gear train 26. At corners joining the three sections of the main-conveyer L, turn tables T are located for turning the pallet P through a right angle.

Along the assembling line are several working stations, namely, a brake assembly fixing station S1, a lock nut fitting station S2, a lock nut fastening station S3, a lock nut staking station S4, a strut assembly setting and fixing station S5, and a hub cap fitting station S6. On one side, the right side as shown in FIG. 3(A), of the brake assembly fixing station S1, is first sub-conveyer L1 for conveying a rear axle unit RA with its associated elements to the main conveyer L. The brake drum 10 is put on pallet P on main conveyer L centered over hole PO and advanced to station S1. Drum 10 is put on pallet P by the aid of, preferably, a manipulator or robot hand, as is known. The brake drums 10 are placed outside down on the pallet P and conveyed by the main-conveyer L one after another at regular intervals to station S1. At station S1, the rear axle units RA conveyed to this point by sub-conveyer L1 are assembled to brake drums 10 by manipulator or robot hand R1 which places each unit RA onto a drum 10 with spindle 2 projected through the center hole of drum 10 as shown in FIG. 1 to form rear axle sub-assembly AS.

Beside the lock nut fitting station S2 is a part feeder F1 for feeding lock nuts 14. The lock nut 14 is threaded onto the threaded area 2A of the spindle 2 of the rear axle sub-assembly AS, as shown in FIGS. 1 and 2 by the use of, preferably, a manipulator or robot hand R2. Further, on one side of the strut assembly setting and fixing station S5 is second sub-conveyer L2 for conveying a strut assembly (not shown). The strut assembly conveyed by the second sub-conveyer L2 is put on and fixed to the rear axle sub-assembly AS by the use of, preferably, a manipulator or robot hand R3 similar to the robot hand R1. Operation and fabrication of such manipulators R1, R2 and R3 are well known to those skilled in the art and need not be explained herein.

At the brake unit fixing station S1, the rear axle unit RA is fixed to the brake drum 10 placed on the pallet P outside down. The rear axle unit RA consists of brake unit 6, the spindle 2, the knuckle 7 and their associated elements which are previously assembled as one body and conveyed by the sub-conveyer L1 to main conveyer L. The manipulator R1 operates to put the rear axle unit RA on the brakeddrum 10 placed on the pallet P and mounts them together, thereby providing the rear axle sub-assembly AS.

At the lock nut fitting station S2, the foremost lock nut 14 supplied by the part feeder F1 is grasped an threadingly fitted to the threaded area 2A of the spindle 2 by the aid of the manipulator R2. At this station S2, the lock nut 14 is threaded onto area 2A of spindle 2 but not tightened too firmly. The lock nut 14 is tightened fast with a predetermined or preselected tightening torque at the lock nut fastening station S3. This fastening operation may be effected in any well known manner, preferably by using, for example, an impact or torque wrench whose operation and structure are well known to those versed in the art and need not be described o elaborated herein.

The rear axle sub-assembly AS is transferred to the lock nut staking station S4 where the lock nut 14 is staked by denting or crimping the thin lip 15 on the lock nut 14 to deform the lip 15 to fit into tapered groove or slot 4 cut into the end of area 2A by means of the working apparatus of the present invention which will be described in detail later.

At the strut assembly setting and fitting station S5, the strut assembly conveyed by the second sub-conveyer L2 is put on and fitted tightly to the rear axle sub-assembly AS by the manipulator R3. Finally, at the hub cap fitting station S6, the hub cap 16 is press fitted into the central bore of the annular hub 10A of the brake drum 10 to complete the rear axle assembly A. The press fitting of hub cap 16 is accomplished by the aid of the working apparatus of the present invention which will be described in detail later.

Reference is now had to FIGS. 4 through 11 showing in detail the working apparatus of the present invention which is used to stake the lock nut 14 at the lock nut staking station S4. The working apparatus B installed on floor F of the assembly line includes a working table 31 supported by columns 32 in a fixed or stationary placement below the main-conveyer L. This working table 31 is formed with a center opening 31A for allowing easy access to the rear axle sub-assembly AS mounted on the pallet P from beneath table 31.

Figure 4:
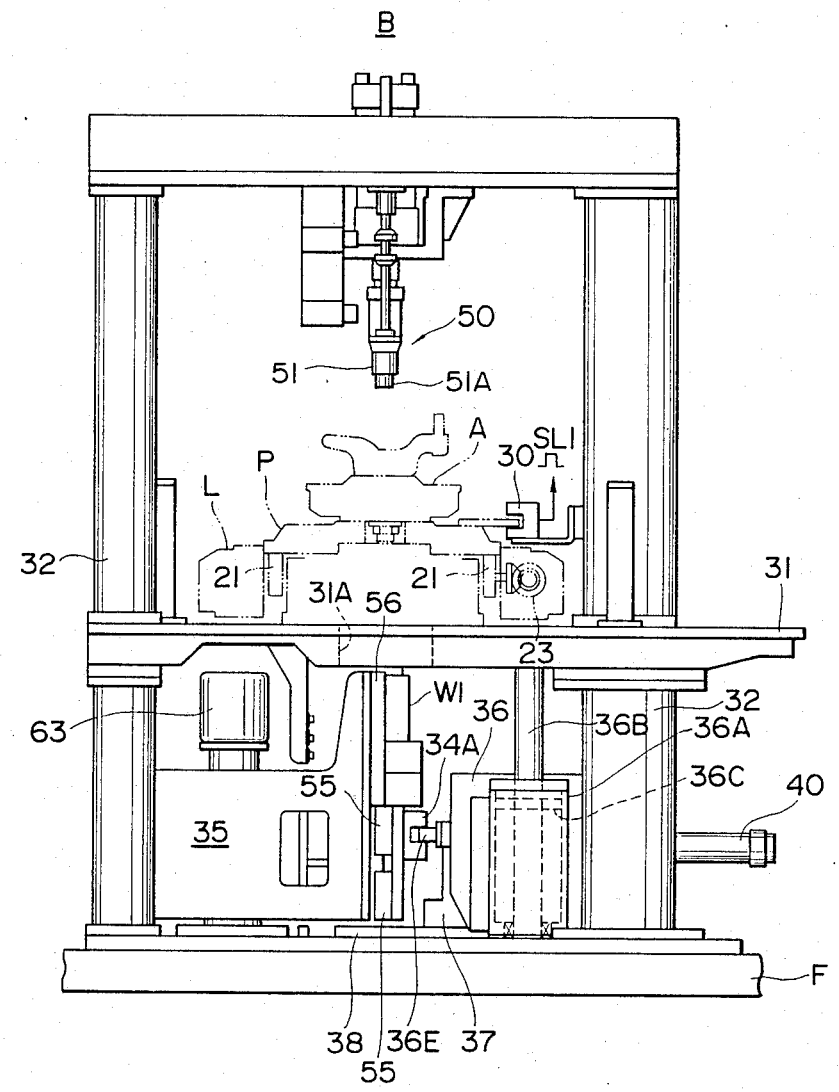
FIG. 4 is a side elevational view showing the working apparatus of the present invention equipped with a working head adapted to be used, in particular, for staking a lock nut and which is installed in the automatic rear axle assembling line shown in FIG. 3(A)
Figure 5:
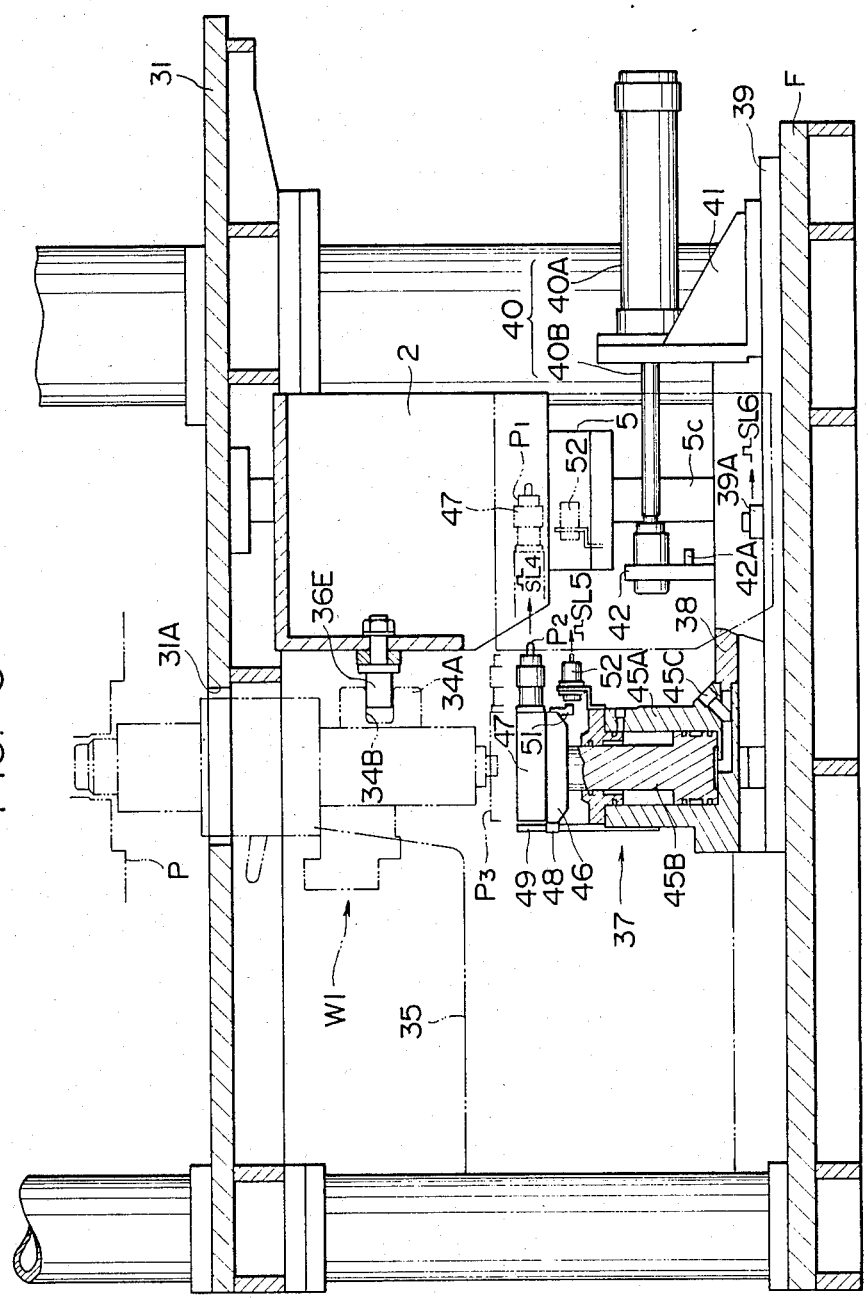
FIG. 5 is a front elevational view, partly in cross section, of the working apparatus of FIG. 4 with the working head in a working position.

Beneath the working table 31, a working head W1 is situated, movable vertically between its out-of-operation (inoperative) or rest position, as shown in FIG. 4, and its operating or working position, as shown by a double dotted line in FIG. 5. The staking operation for the lock nut 14 is effected by denting the thin lip 15 on the lock nut 14. As will be described in detail later, the working head W1 is supported by a swingable frame 35 for vertical movement. Adjacent to the working head W1 in the rest position, there is a lifting device 36 for moving the working head W1 u and down between the rest and working positions. This lifting device 36, which is shaped in the form of a generally basket-handle arch, is rigidly secured at its opposite sides to a pair of cylinders 36A. The arch-shaped lifting device 36 has a pair of connecting lugs 36E laterally projecting therefrom and engageable with corresponding grooves or recesses 34B (see FIG. 8) formed in connecting members 34A of the working head W1. Members 34A are fixed on plates 54. Each cylinder 36A has piston rod 36B which is fixed between the working table 31 and a mounting plate 39 (see FIG. 5) secured to the floor F. At the middle portion of the fixed piston rod 36B a flange member or piston 36C is fixed to the fixed piston rod 36B. Flange member 36C is relatively slidably fitted within the cylinder 36A to form pressure chambers therebetween. Due to this construction, the cylinder 36A is vertically moved up and down relative to the fixed rod 36B by developing air or hydraulic pressure therein and by relieving the pressure therefrom. With this vertical movement of the cylinder 36A, the lifting device 36 via lugs 36E and recesses 34B and members 34A can move vertically up and down, thereby moving the working head W1 between the rest and working positions.

Beside the working head W1 in its rest position and mounted within the profile of the lifting device 36, there is a driving or operating device 37 mounted on a mounting stage 38. This operating device 37 is adapted to reciprocate or move sideways to a position where it cooperates with the working head W1 in its working position and operates to make the working head W1 effect a lock nut staking operation, which will be described in detail later. The mounting stage 38 is slidably mounted on base plate 39 fixed to the floor F for horizontal movement between a position where the operating device 37 is placed o spaced apart from the working head W1, placed in a rest position within the lifting device 36, and a position where the operating device 37 is placed in cooperation with the working head W1 in the working position. This horizontal lateral movement of the mounting stage 38 is caused by a shifting means 40 supported by a bracket 41 mounted on the base plate 39. Specifically, the shifting means 40 consists of a hydraulic or air cylinder 40A fixedly held by the supporting bracket 41 secured to the base plate 39 and a piston rod 40B of the cylinder 40A connected at its end to a stud plate 42 fixed on and extending upwardly from the mounting stage 38. As is best seen in FIG. 7, the lifting device 36 has a top wall with a cutaway portion 36D formed therein for receiving the operating device 37 therein without any interference.

The operating device 37, as is shown in detail in FIG. 5, includes a hydraulic actuator 45 having a base column hydraulic cylinder 45A and a piston rod 45B slidably fitted in the base column cylinder 45A for vertical movement. The piston rod 45B is provided at its top end with a mounting plate 46 on which is mounted a load sensor 47. This load sensor 47 is adapted to produce a signal SL4 when detecting a predetermined load exerted thereon. The base column cylinder 45A communicates with a pressure source 29 (see FIG. 11) through a pressure inlet port 45C. The pressure applied into the cylinder 45A forces the piston rod 45B to move up to its cooperating position P3 (shown by a double dotted line in FIG. 5), so as to push up the working head W1. Provided on one side of the mounting plate 46 is a guide member 48 for guiding a guide rod 49 extending from the base column cylinder 45A and, on the opposite side, a position indicating member 51 which is detected by a position sensor 52 attached to the base column cylinder 45A to produce a position signal SL5 when the mounting plate 46, and hence the piston rod 45B, is in its lowered position P2. The signals SL1 and SL2 are transferred to a pressure control unit 28 (see FIG. 11) independently.

Figure 6:
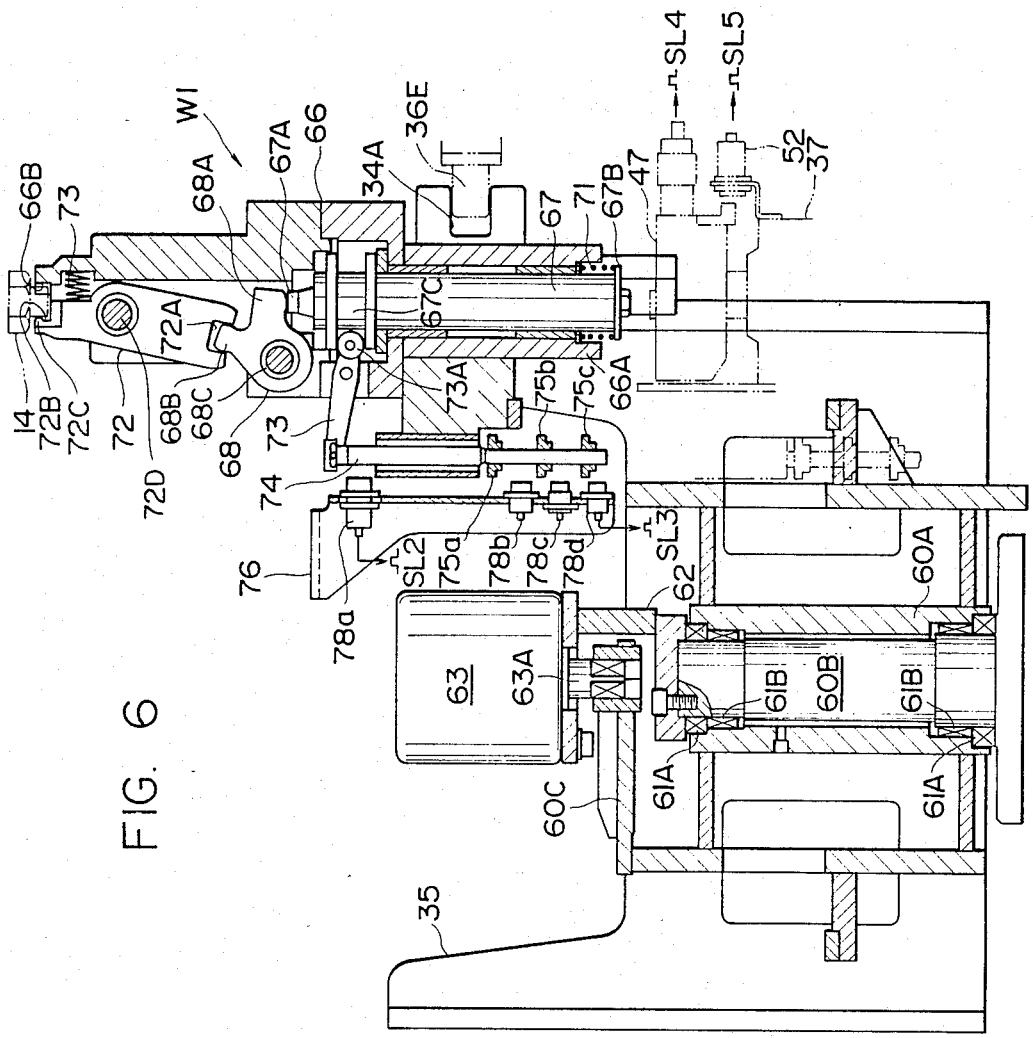
FIG. 6 is an enlarged sectional view showing the working head placed in the working position.
Figure 7:
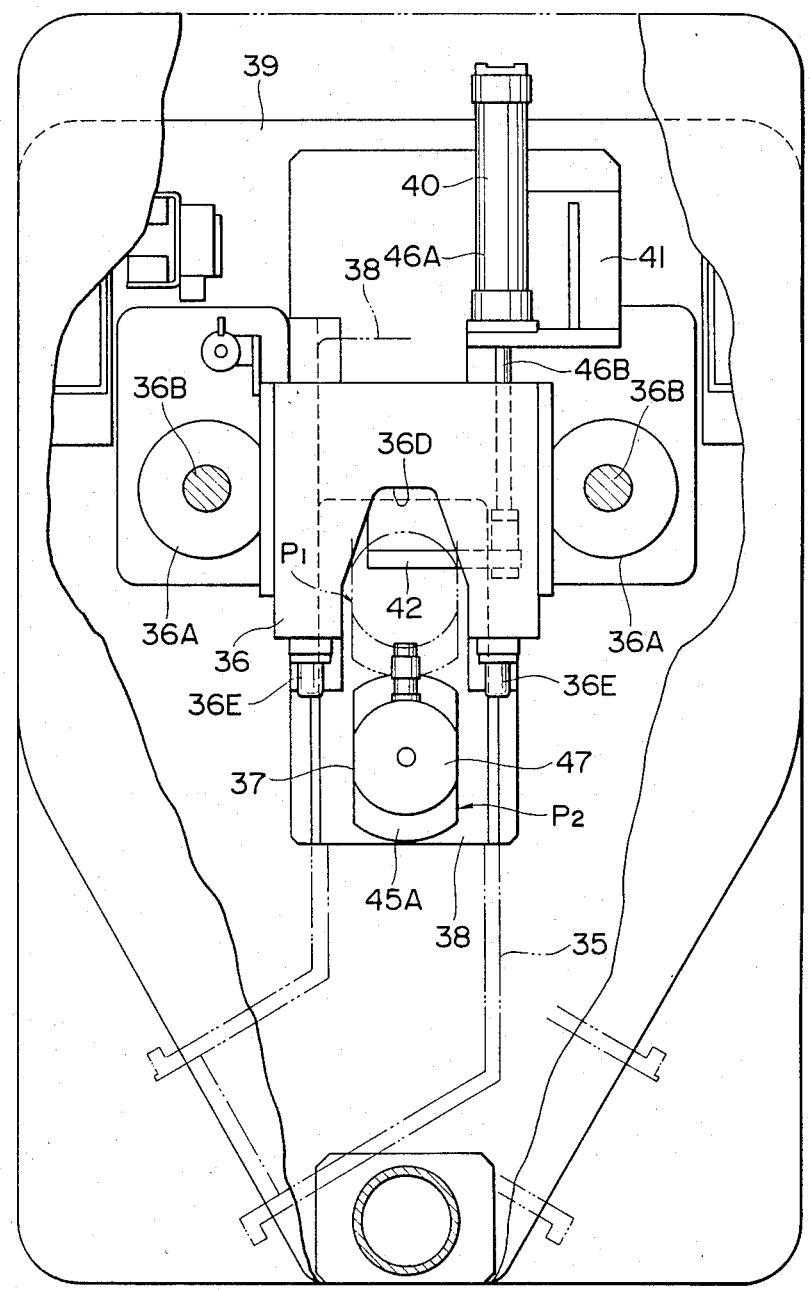
FIG. 7 is a plan view showing the working apparatus of FIG. 4.
Figure 8:
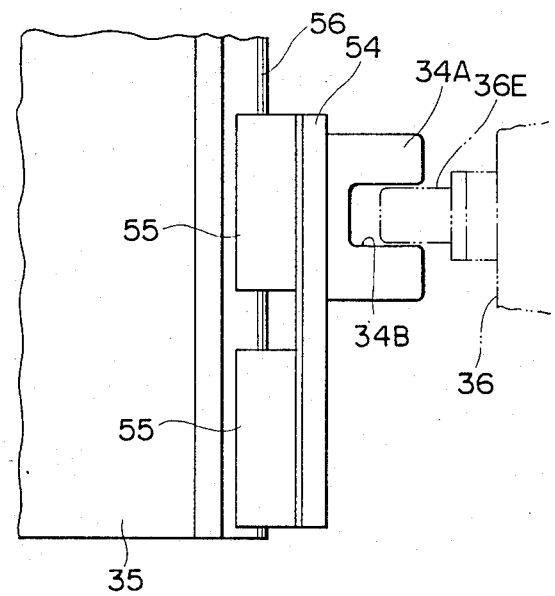
FIG. 8 is an illustration showing in detail the coupling between the working head of FIG. 6 and a swingable frame.
Figure 9A:
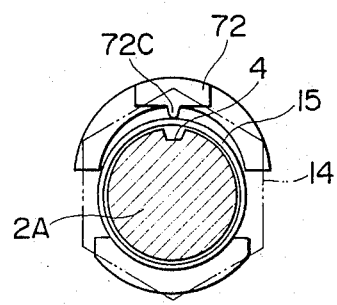
FIGS. 9(A) and (B) are before and after illustrations of the staking operation showing the lock nut with a thin lip fastened to a threaded spindle of the rear axle assembly.
Figure 9B:
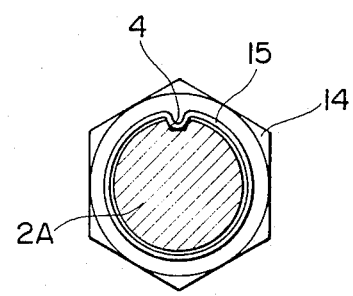
Figure 10:
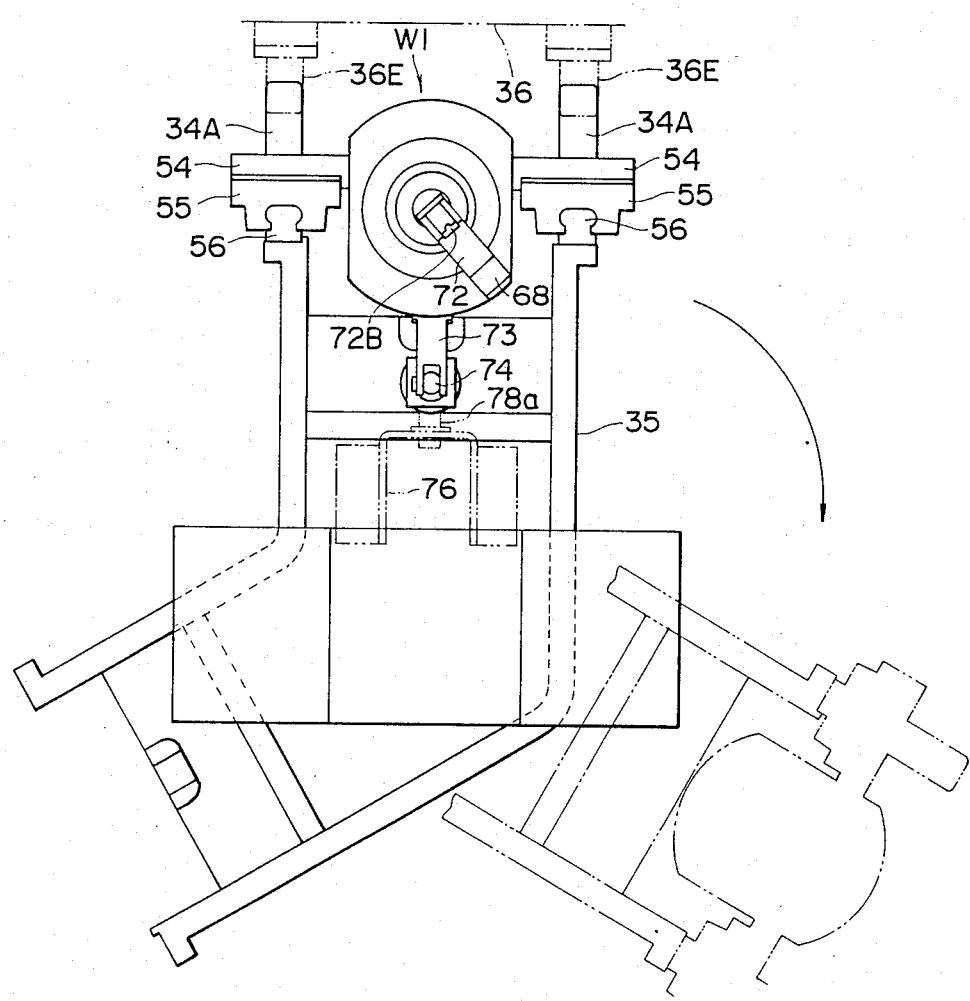
FIG. 10 is a fragmentary illustration of the swingable frame with the working head supported thereby.

As is shown in detail in FIGS. 6 to 8, the working head W1 is provided at the side formed with the connecting members 34A with grooves 34B, with side plates 54 fixed to guide members 55 slidably mounted on a vertical guide rail 56 provided at one end of the swingable frame 35. Members 34A are fixed on plates 54. By this guide rail 56, the working head W1 is allowed to move vertically up and down. This swingable frame 35 is shaped in the form of dogleg configuration and is provided at its middle section with a cylindrical hollow pole 60A which is rotatably supported by a vertical pivot shaft 60B through bearings such as ball bearings 61A and needle bearings 61B. Formed at the top end of the pivot shaft 60B is a supporting bracket 62 which holds thereon an electric motor 63 having an output shaft 63A disposed coaxially with the pivot shaft 60B. This output shaft of the motor 63 is fixedly attached to an extension arm 60C of the cylindrical pole 60A of the swingable frame 35. Therefore, through a rotation of the electric motor 66, the swingable frame 35 is turned about the pivot shaft 60B through a predetermined angle enough to place the working head W1 out of the rest position.

The working head W1 thus supported by the swingable frame 35, as is best seen in FIG. 6, has a casing 66 with an arcuate recess or fixed jaw 66B at its top end and a hollow cylindrical extension 66A extending downwardly therefrom. In the hollow cylindrical extension 66A there is a vertical spindle rod 67 slidably fitted. This vertical spindle rod 67 has an abutment member 67A at its top end and a flange 67B at its lower end. Between the hollow extension 66A of the casing 66 and the flange 67B of the spindle rod 67, there is a coil spring 71 by which the spindle rod 67 is biased downwardly. Over the piston rod 67 there is a crank lever 68 pivotally mounted on the casing 66 by a pivot pin 68C. This crank lever 68 has first arm 68A engaged by the abutment member 67A of the spindle rod 67 and second arm 68B engaging with a recess 72A formed in a staking lever 72 which is swingably or pivotally mounted on the casing 66 by a pivot pin 72D. The lever 72 at its top end has an arcuate recess or swingable jaw 72B with a vertical edge 72C formed on its inner surface. Between the casing 66 and the lever 72 there is a compressed coil spring 73 by which the swingable lever 72 is biased away from the fixed jaw 66B to form or define a nut lip receiving space between the jaws 66B and 72B for receiving therein the annular lip 15 of the lock nut 14 threaded onto area 2A of spindle 2.

The spindle rod 67 has a reduced section at its upper portion to form an annular groove 67C into which is received a roller 73A rotatably mounted at one end of a position detecting lever 73 pivotally mounted intermediate its ends on the casing 66. The other end of this position detecting lever 73 is connected to a rod 74 mounted for vertical movement or reciprocation responsive to actuation by lever 73. Rod 74, at its lower end, has a plurality of position index members 75a to 75c fixed thereto in vertically spaced relation. Adjacent to the movable rod 74 is a frame member 76 extending from the swingable frame 35. This frame member 76 supports position sensors 78b to 78d spaced at regular intervals and a position sensor 78a spaced vertically above the position sensors 78b to 78c. The position sensors 78a to 78c are juxtaposed relative to rod 74 and members 75a to 75c as depicted in FIG. 6. The position sensor 78a detects the movable rod 74 and produces a signal SL2 which in turn is transferred to the pressure control unit 28 to control the pressure source as such so as to suspend the pressure supply into the cylinders 36A of the lifting device 36 thereby maintaining the working head W1 at its lifted position, namely, the working position, and simultaneously to supply pressure into the cylinder 40A of the shifting means 40 so as to move the mounting stage 38 horizontally laterally in order to place the operating device 37 below the working head W1 placed in the working position.

When one of the position sensors 78b to 78d detects a position index member 75a to 75c, it produces a signal SL3 which in turn is transferred to the pressure control unit 28 by which the pressure source is controlled to decrease the rate at which pressure is continuously applied into the cylinder 45A of the operating device 37.

After the working head W1 has been lifted into the working position by means of the lifting device 36, the operating device 37 is placed in position under the working head W1. By supplying hydraulic pressure into the column cylinder 45A through the pressure inlet port 45C, the piston rod 45B is forced to protrude upwardly, pushing up the spindle rod 67 against the bias of coil spring 71. As result, the spindle rod 67 presses against the first arm 68A of the crank lever 68 with the abutment member 67A thereof so as to turn the crank lever 68 in the counterclockwise direction. Through the engagement between the second arm 68B of the crank lever 68 and the lower end recess 72A of the lever 72, the lever 72 is forced to turn in the clockwise direction as viewed in FIG. 6 to nip and, then, dent the nut lip 15 of the lock nut 14 and deform it to fit into the groove 4 in the threaded area 2A of the spindle 2. During the denting of the lip 15 of the lock nut 14, if the load sensor 47 detects a predetermined load exerted on itself from the spindle rod 67, it produces a signal SL4 which in turn is applied to the pressure control unit 28 to relieve the hydraulic pressure in the column cylinder 45C. Consequently, the piston rod 45B of the operating device 37 gradually returns from its operating position P3 to its lowered position P2, shown in FIG. 5, which is followed by a downward movement of the spindle rod 67, allowing the lever 72 to turn in a counterclockwise direction under the influence of the bias of the compression spring 73.

At the moment the piston rod 45B of the operating device 37 returns to its lowered position P2 shown in FIG. 5, the position sensor 52 detects the positioning member 51 to produce a signal SL5 which in turn is transferred to the pressure control unit 28 to relieve the pressure from the cylinder 40A of the shifting means 40. Consequently, the piston rod 40B of the shifting means 40 due to bias or pressure is retracted to return the mounting stage 38 and the operating device 37 to the position P1 shown by the double dotted line in FIG. 5.

On the base plate 39 there is a position sensor 39A for detecting a position member 42A attached to the stud plate 42. Upon the position sensor 39A detecting the position member 42A, it produces a signal SL6 which in turn is transferred to the pressure control unit 28 so as to relieve the pressure from the cylinders 36A of the lifting device 36. The lifting device 36 come down followed by the working device W1.

When the position sensor 78a detects that the working head W1 is placed out of the working position, the signal position sensor 78a produces a signal SL4 which is transferred to the control unit 28 to cause the motor 63 to start its rotation. By the rotation of the motor 63, the swingable frame 35 turns and removes the working head from under the working table 31.

It is to be noted that the position sensors may take any form well known to those skilled in the art, for example, photo-sensors having a light emitting diode and light receiving element. If in fact such a photo-sensor is utilized as the position sensor, the position member should be a light reflecting member.

Figure 12:
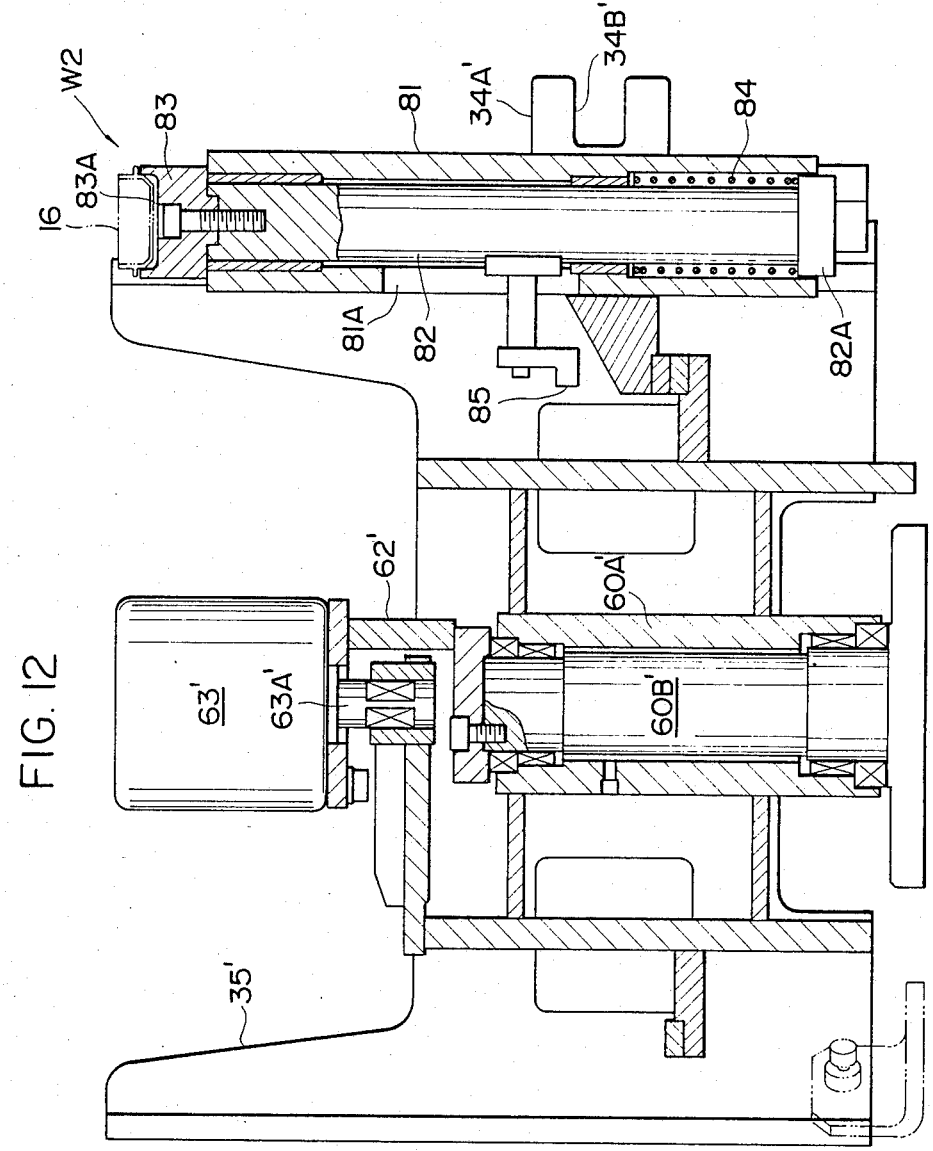
FIG. 12 is an enlarged sectional view, similar to FIG. 6, showing the working apparatus with a working head suitable for fitting a hub.

Reference is now had to FIG. 12 showing the working apparatus of the present invention disposed at the hub cap fitting station S6. In the following description, reference numbers marked with a prime indicate the same apparatus or structure as previously described for the same reference number. Much of this common structure has not been illustrated in the drawings for sake of simplicity and clarity. This working apparatus is substantially the same as that disposed at the staking station S4 but has a different working head W2 suitable for the hub cap fitting operation. The working head W2 consists of a cylindrical hollow casing 81 and a spindle rod 82 slidably fitted in the cylindrical hollow casing 81. At the top of the spindle rod 82 there is a hub cap receiving member 83 with circular recess 83A formed therein for receiving a hub cap 16. The hub cap receiving member 83 has an outer diameter larger than the inner diameter of the cylindrical hollow casing 81 and is bolted to the spindle 82. On the other hand, the spindle rod 82 has at its lower end a flange 82A. Between the flange 82A and the cylindrical hollow casing 81 there is a coil spring 84 for biasing the spindle rod downwardly. At the middle of the cylindrical hollow casing 81 is formed a vertically extending slot or opening 81A through which a positioning member 85 fixed to rod 82 extends to the outside of the cylindrical hollow casing 81. This positioning member 85 is detected by a position sensor like sensor 78a to provide a signal SL2' which is transferred to a pressure control unit 28' to cause a pressure source 29' to supply pressure into cylinder 40A' of shift means 40' like that shown in FIG. 5. The cylindrical hollow casing 81 is slidably mounted on guide rails 56' of swingable frame 35' by means of the guide members 55' secured to side plate 54' of the working head W2.

The working head W2 thus constructed can be lifted to its working position by means of lifting device 36' in the same way as described as to the working head W1. In the working position, operating device 37' gently pushes up the spindle rod 82 against the coil spring 84 to press-fit the hub cap 16, received and held in the circular recess 83A formed in the hub cap receiving member 83, into the hub 10A of the brake drum 10 of the rear axle sub-assembly AS placed on the pallet P. When load sensor 47' of the operating device 37' detects a predetermined load exerted on itself by the spindle rod 82, the load sensor 47' provides a signal SL4'. After the provision of the signal SL4', the working apparatus performs the same operation as described for the staking operation.

Figure 13A:
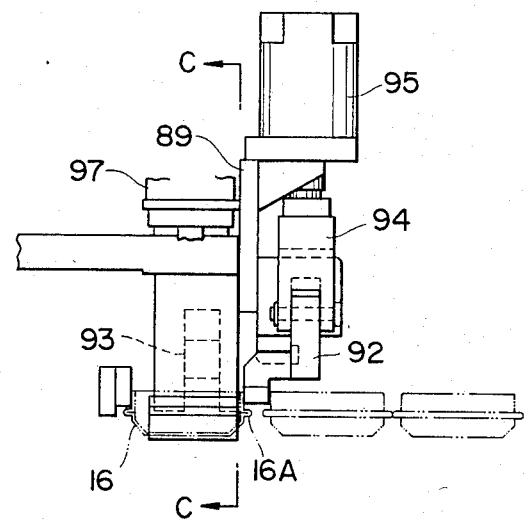
FIGS. 13(A), (B) and (C) are side views showing a hub cap handling device used in cooperation with the working apparatus of FIG. 12.
Figure 13B:
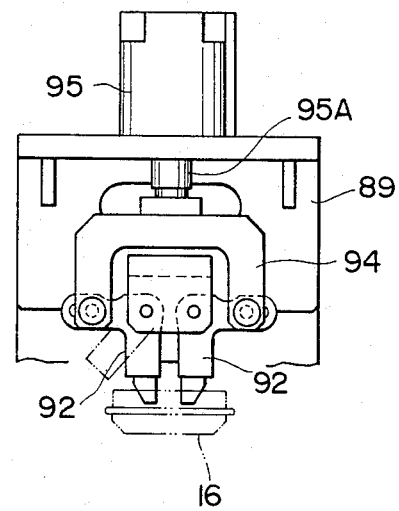
Figure 13C:
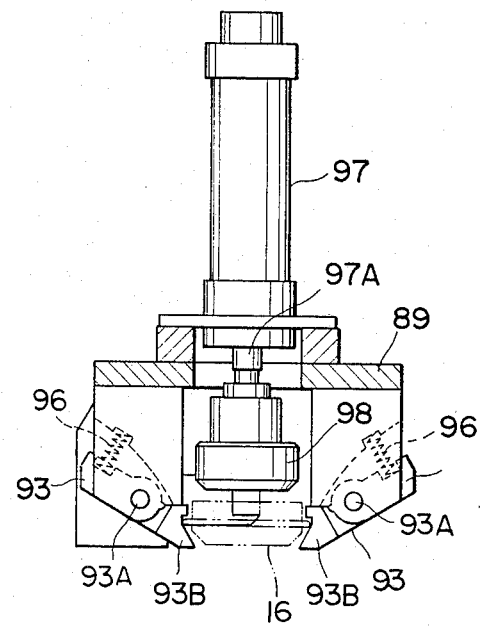

When swingable frame 35' is turned to place the working head W2 out of the rest position beside the conveyer L, another hub cap 16 is supplied and placed in the hub cap receiving member 83 of the working head W2. A hub cap handling device as shown in FIGS. 13(A) to (C) is utilized for supplying and putting the hub cap 16 into the hub cap receiving member 83 positioned outside the working table 31. This handling device is mounted on a mounting panel 89 mounted on one column 32' for pivotal or swinging movement. The handling device consists of a pair of pivoting arms 92 and a pair of holding arms 93. The arms 92 are operatively connected to a U-shaped connecting member 94 which is fixed on the end of a reciprocating piston rod 95A of hydraulic or pneumatic cylinder 95. When the piston rod 95A moves up and down, the arms 92 open and close, thereby separating the foremost hub cap 16 from hub caps successively supplied by a part feeder which is well known per se and need not be shown and described herein. The separated hub cap 16 is passed forward by the offset ends of arms 92 to arms 93.

The holding arms 93 with a tapered finger 93B are pivoted at 93A on the mounting panel 89 for swing motion an are urged or biased by springs 96 to close their tapered fingers 93B to form therebetween a space having a transverse width slightly narrower than the diameter of the collar 16A of the hub cap 16. Therefore, the holding arms 93 can receive and hold the hub cap 16 pushed out by the part feeder and separated by the swing arms 92.

Overhead the holding arms 93 is a cylinder 97 having piston rod 97A with a push head 98 located between the holding arms 93. Cylinder 97 is mounted on panel 89. When the piston rod 97 moves downwardly, the push head 98 forces the hub cap 16 downwardly, forcing the holding arms 93 to open against the springs 96, and thereby the hub cap 16 is pushed out of the space formed between the tapered fingers 93B. The hub cap 16 is pushed out into the circular recess 83A formed at the top of the hub cap receiving member 83 of the working head W2.

The steps or sequences for staking of the lock nut 14 and the fitting of the hub cap 16 will now be described. A brake drum 10 placed in position on the pallet P is conveyed by the main-conveyer L and placed in the rear axle assembly station S1. A rear axle unit RA consisting of the brake unit 6, the spindle 2, the knuckle 7 and their associated elements is put on and fitted to the brake drum 10 to prepare the rear axle sub-assembly AS. The fitting of the rear axle unit RA may be performed by means of the manipulator R1. The rear axle sub-assembly AS on the pallet P is then transferred to and placed in the lock nut fitting station S2 where the lock nut 14 fed by part feeder F1 is loosely threaded onto the threaded area 2A of the spindle 2 by means of the manipulator R2. Thereafter, the rear axle sub-assembly AS with the lock nut 14 threaded onto the threaded area 2A of the spindle 2 is transferred to the lock nut tightening or fastening station S3. At this station S3, by using an automatic fastening means such as an impact or torque wrench, the lock nut 14 is tightly fastened with a predetermined or preselected torque and thereby fixes tightly the rear axle assembly AS. The operations at the stations S1 through S3 may be performed either manually or automatically, in any manner well known to those skilled in the art. The rear axle assembly AS on the pallet P is consequently transferred to and placed in the lock nut staking station S4.

When the pallet sensor 30 detects the pallet P, it provides a start signal SL1. Under the presence of the start signal SL1, the pressure control unit 28 controls the pressure source 29 to supply pressure to cylinder 51 of clamping means 50 moving clamping head 51A downward into contact with the rear axle sub-assembly AS and it clamps sub-assembly AS. At the same time, the control unit 28 causes the electric motor 63 to start its rotation in a first or normal direction, swinging the swingable frame 35 to bring the working head W1 from a remote position to just below the opening 31A of the working table 31, namely, placing the head W1 in the rest position. At the end of the swinging movement of the swingable frame 35, the working head W1 is brought into engagement with the lifting device 36 through the connecting lugs 36E and the connecting members 34A. Then, as the first step in a sequential control of operation, the control unit 28 causes the pressure source 29 to supply pressure to the cylinders 36A of the lifting device 36 when a predetermined time lapses after the presence of the start signal SL1 to lift up the lifting device 36. As a result, the working head W1 is raised up to the working position shown by a double dotted line in FIG. 5 passing the opening 31A of the working table 31. At the moment that the casing 66 of the working head W1 is detected by the position sensor 78a, that means that the lip receiving space defined or formed by the fixed and swingable jaw 66B and 72B has received therein the lip 15 of the lock nut 14 fastened to the threaded area 2A of the spindle 2 placed on the pallet P. A signal SL2 is produced from the position sensor 78a and transmitted to the control unit 28 to cause the pressure source 29 to supply pressure into the cylinder 40A of the shifting device 40. With the development of pressure in the cylinder 40A, the piston rod 40B is forced to thrust out, reciprocating the mounting stage 38 to place the operating device 37 mounted thereon in cooperating position beneath the working head W1.

When a predetermined time lapses after generation of the signal SL2 from the position sensor 78a, the control unit 28 causes the pressure source 29 to supply pressure into the column cylinder 45A of the driving device 45. With the development of pressure in the column cylinder 45A, the piston rod 45B thrusts out relatively rapidly until the load sensor 47 is brought into contact with the lower end of the spindle rod 67 and pushes u vertically the spindle rod 67 against the coil spring 71. The vertical movement of the spindle rod 67 is transmitted to and changed to a vertically downward movement of the position detecting rod 74 through the link lever 73 and detected by one, for example, the position sensor 78d, of the position sensors 78b to 78d, which are previously indexed and arranged according to the size of the lock nut 14 to be worked.

If in fact the position sensor 78d detects one, for example, the position index member 75c, of the position index members 75a to 75c attached to the position detecting rod 74, the position sensor 78d generates a signal SL3 which is transmitted to the control unit 28. Upon receiving the signal SL3 provided from the position sensor 78d, the control unit 28 causes the pressure source 29 to decrease the rate at which pressure is supplied into the cylinder 45A of the operating device 45. Consequently, the piston rod 45B of the operating device 45 is made to move gently, pushing up the spindle rod 67 with a large thrusting force. Due to the upward thrusting movement of the spindle rod 67, the crank lever 68 with the first arm 68A engaged by the abutment member 67A of the spindle rod 67 is turned in the counterclockwise direction, thereby turning the staking lever 72, with the lower recess 72A engaged by the second arm 68B, in the clockwise direction; the staking lever 72 by mean of the edge 72C deforms, crimps or dents the thin lip 15 of the lock nut 14 into tapered slot 4 cut into the threaded area 2A of the spindle 2 and stakes the lock nut 14.

When the load sensor 47 detects a predetermined load exerted thereon from the spindle rod 67, during the denting operation of the staking lever 72, the load sensor 47 provides the control unit 28 with a signal SL4. As described previously, upon receiving signal SL4, the pressure source 29 is controlled by the control unit 28 to relieve the pressure in the cylinder 45A of the operating device 45, allowing the piston rod 45B to retract into the cylinder 45A. Therefore, the spindle rod 67 is forced to move downwardly by the bias of the coil spring 71, followed by a turn of the lever 72 in the counterclockwise direction due to the bias of the compressed spring 73. As a result, the clamping jaws unclamp the lip 15 of the lock nut 14. During retraction of the piston rod 45B, the position sensor 52 attached to the cylinder 45A detects the positioning member 51 attached to the piston rod 45B to provide the control unit 28 with a position signal SL5. The control unit 28 causes the pressure source 29 to relieve the pressure in the cylinder 40A of the shifting device 40 to allow the piston rod 40B to retract into the cylinder 40B reciprocating the mounting stage 38 and the operating device 37 carried on the mounting stage 38 to position Pl.

During return of the mounting stage 38, the position sensor 39A disposed on the base plate 39 detects the positioning member 42A to provide the control unit 28 with a signal SL6 that controls the pressure source 29 and relieves the pressure in the cylinders 36A of the lifting device 36, allowing the lifting device 36 to move downwardly, followed by the working head W1. As a result, the signal SL2 will disappear because the working head W1 is removed from position sensor 78a. As a result of the disappearance of the signal SL2, the control unit 28 causes the motor 63 to start its rotation but in the reversed direction, turning the swingable frame 35 about the vertical shaft 60B.

After the completion of the staking operation of the lock nut 14, the rear axle assembly AS on the pallet P is transferred to the strut setting and fixing station S5, where a strut assembly conveyed by the second subconveyer L2 is fitted to the rear axle sub-assembly AS by the use of the manipulator R3, in an operation well known in the art. The rear axle sub-assembly AS with the strut assembly fitted thereon is then transferred to the final station, namely, the hub cap fitting station S6. When the rear axle sub-assembly AS is placed in position at the hub cap fitting station S6, a clamping means 50' is actuated to clamp the rear axle sub-assembly AS by clamping head 51A.

At the hub cap fitting station S6, the hub cap handling device 90 is ready for putting a hub cap 16 onto the working head W2. The swingable frame 35' of the working apparatus at the hub cap fitting station S6 is positioned to locate the working head W2 outboard of the working table 31'. This was done at the end of a previous fitting operation for the preceding rear axle sub-assembly. The cylinder 97 of the hub cap handling device is actuated to move downwardly gently the piston rod 97A, pushing out a hub cap 16 from the holding arms 93 against the springs 96. As a result, the hub cap 16 drops from the handling device 90 into the hub cap receiving member 83 of the working head W2.

When a pallet P reaches the hub cap fitting station S6 and is detected by pallet sensor 30', the working head W2 receives the hub cap 16 as described and the swingable frame 35 is turned to place the working head W2 below the working table 31' in the hub cap fitting station S6. At the end of the turning of the swingable frame 35', the connecting lugs 36E' of the lifting device 36' are brought into engagement with the recesses 34B' of the connecting member 34A' of the working head W2 to couple together the working head W and the lifting device. At the moment the working head W2 is placed in position, the lifting device 36' is actuated to lift up the working head W2 to the working position. In the same manner, as previously described, for the staking of the lock nut 14, the working apparatus is sequentially operated to perform the operations of the working head W2. Specifically, as can be understood from FIG. 12, the hub cap 16 received in the hub cap receiving member 83 at the top of spindle rod 82 is thrusted into the hub 10A of the brake drum 10 of the rear axle assembly AS. This results from the upward movement of the spindle rod 82 caused by operating device 37', and hub cap 16 is press-fitted to the hub 10A of the brake drum 10. After the completion of fitting the hub cap 16 to the hub 10A of the brake drum 10, the swingable frame 35' is again turned to place the working head W2 outboard of the working table 31 and just below the hub cap handling device where another hub cap 16 is put on the hub cap receiving member 83 at the top of the piston rod 82 of the working head W2 for the next rear axle sub-assembly. In the way described, the rear axle assembly A is fully assembled and removed from the pallet P.

Figure 14:
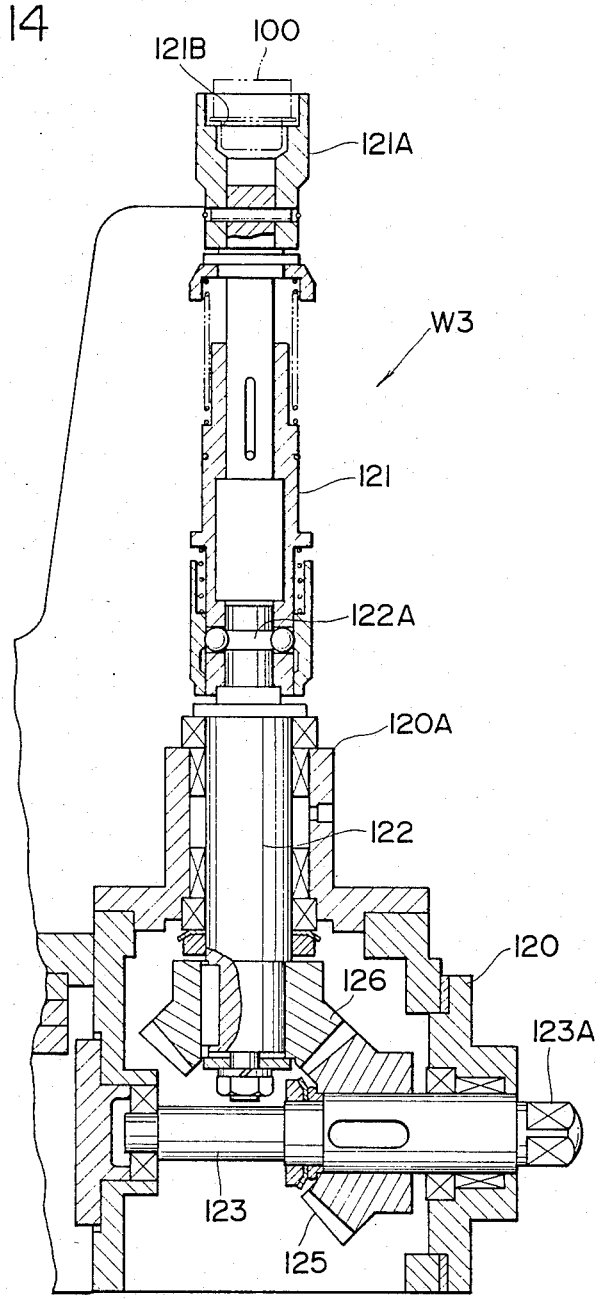
FIG. 14 is an enlarged sectional view showing another embodiment of a working head suitable for fastening a screw cap.
Figure 15:
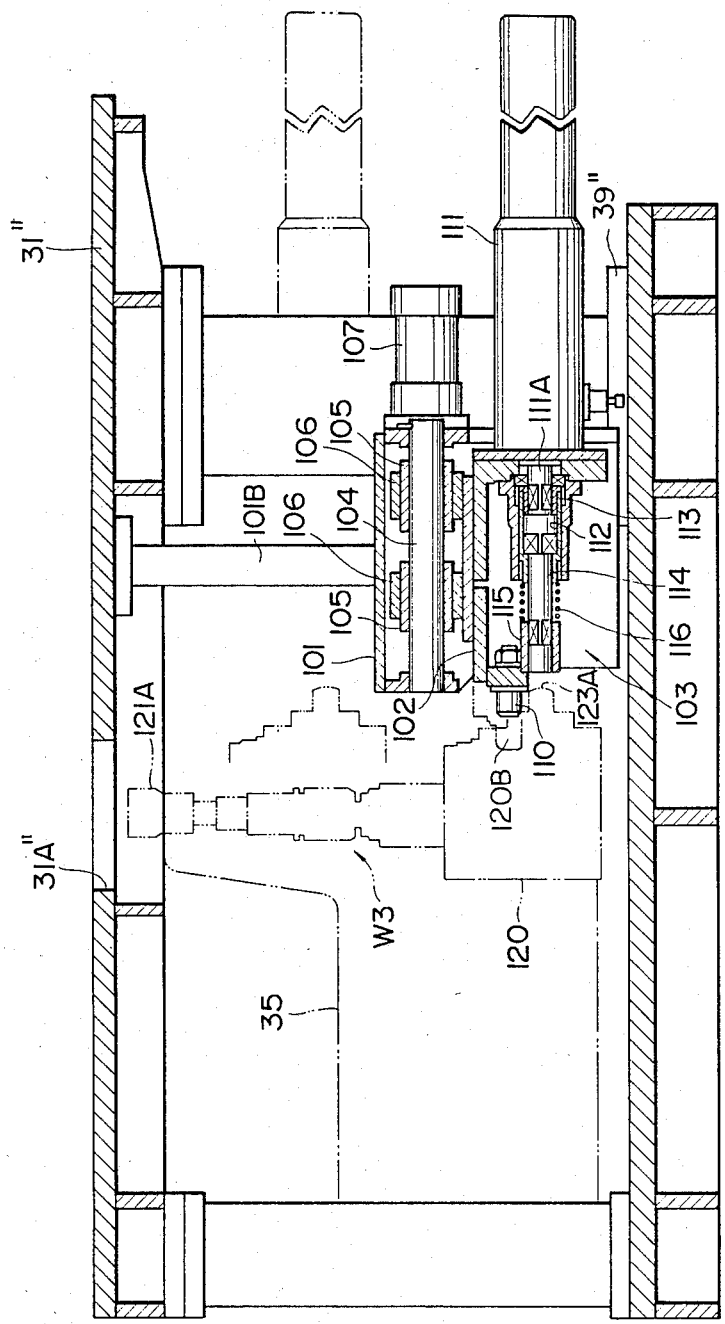
FIG. 15 s a front elevational view showing in detail the portions of the apparatus which cooperate with the working head of FIG. 14.
Figure 16:
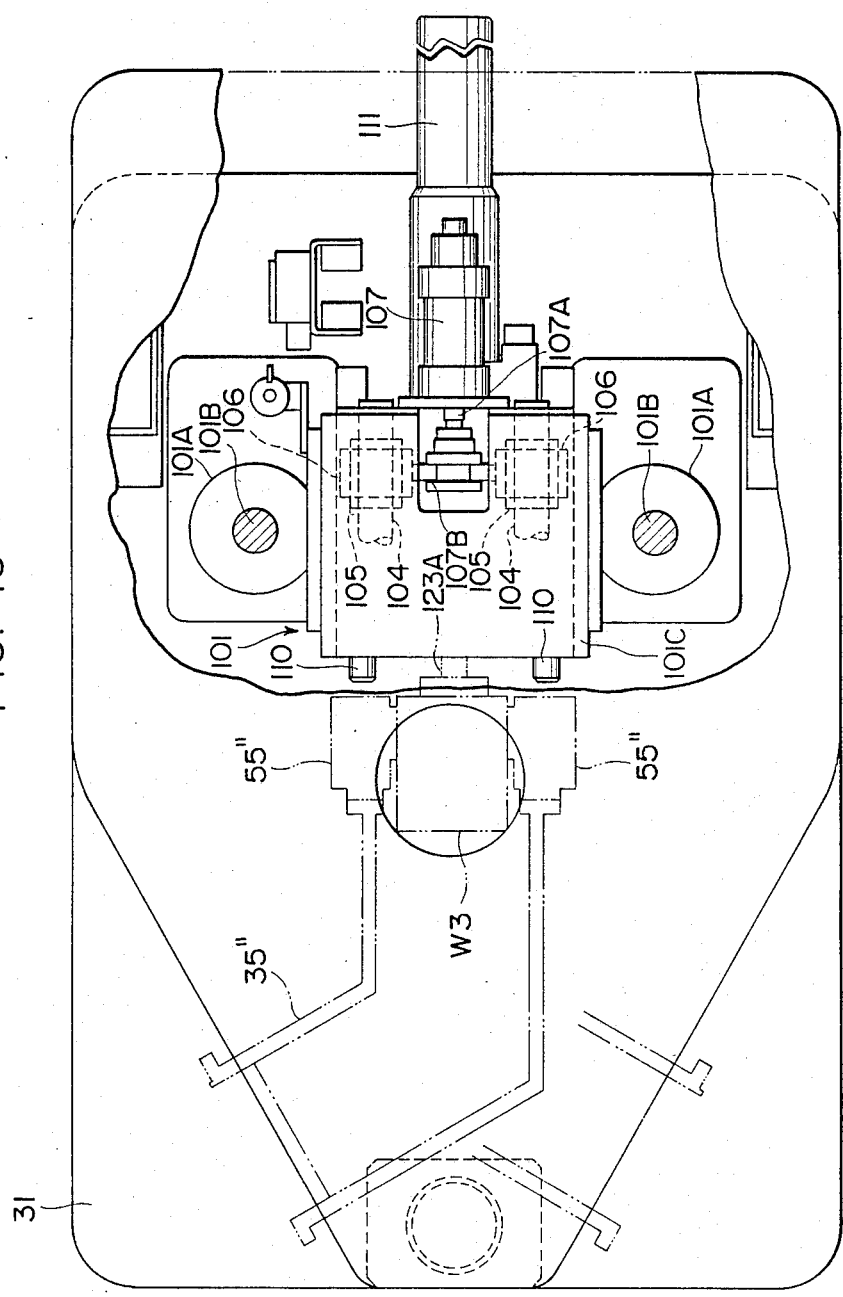
FIG. 16 is a plan view, similar to FIG. 7, showing the apparatus of FIG. 15.

FIGS. 14 to 16 show another preferred embodiment of working apparatus according to the present invention which is suitable for fastening, for example, a screw cap. Again, reference numbers marked with a double prime indicate the same apparatus or structure previously described for the same reference number. This working apparatus has a working head W3, a lifting device 101, shifting device 102 mounted thereon, and a driving or operating device 103 also mounted thereon. The working head W3 is supported by swingable frame 35" for vertical movement between its working and rest positions in the same manner as those of previous embodiments.

Beside the working head W3 there is the lifting device 101, similar to the lifting device 36 of the previous embodiments, for moving vertically up and down the working head W3 between the working and rest positions. Device 101 includes a pair of piston rods 101B fixed between base plate 39" and working table 31", a pair of hydraulic or air cylinders 101A slidably mounted on the piston rods 101B for vertical movement and a housing 101C fixed to cylinders 101A. Mounted on the lifting device 101 is a shifting device 102 consisting of a pair of guide rods 104, each of which slidably supports a pair of guide sleeves 105 for movement. The guide sleeve 105 is coupled to a coupling head 107B fixed to a piston rod 107A of a cylinder 107 through a connecting member 106 fixed to the guide sleeve 105. The shifting device 102 consists of the guide rods 104, the guide sleeve 105, the piston rod and cylinders 107A and 107, and their associated members. On one side of the shifting device 102 there is a pair of connecting pins 110 engageable with recesses 120B of a gear casing 120 of the working head W3 which will be described in detail later The driving device 103 which is mounted on lifting device 101 is carried by or supported by the connecting members 106 of the shifting device 102. The coupling lugs 110 are located at its front end and a nut runner 111 is located at its rear side. An output shaft 111A of the nut runner 111 is connected to one end of a hollow rotatable shaft 112 through a bush 113. Connected to the other end of the hollow rotatable shaft 112 is a solid rotatable shaft 114 having a coupling sleeve 115 slidably mounted for movement. Between the rotatable shaft 112 and the coupling sleeve 115 there is a coil spring 116 mounted on the solid rotatable shaft 114 for biasing or forcing the coupling sleeve 115 to move slightly outwardly.

The working head W3 which, in the rest position, is placed adjacent to the lifting devices 101 and the driving device 103, comprises a gear casing 120 and a spindle rod 121 coupled to a rotatable shaft 122 by means of a joint member 122A. The spindle rod 121 has at its top end a screw cap receiving member 121A formed with a recess 121B for receiving a screw cap 100. The rotatable shaft 122 is rotatably supported by a socket 120A extending upwardly from the gear casing 120. In the gear casing 120, there is a drive shaft 123 which has a coupling end 123A and is rotatably supported by the gear casing 120. Fixedly mounted on the drive shaft 123 is a bevel gear 125 which is meshed with a bevel gear 126 fixed to a lower end of the rotatable shaft 122. It should be noted that the working head W3 is also supported and moved between the working and rest positions by a swingable frame the same a that of the previous embodiments. For this reason, the description is omitted.

In operation of the working apparatus thus constructed, when the working head W3 is placed outboard of the working table, a screw cap 100 is put in the recess 121B of the screw cap receiving member 121A of the spindle rod 121 in well known manner, preferably by the use of a manipulator or robot hand similar to that shown in FIGS. 13(A) to (C). At the moment the pallet P is indexed or placed in position for the fastening operation to proceed, the electric motor 63" of the swingable frame 35" starts its rotation to turn the swingable frame 35" and to place the working head W3 in position at the fastening station just below the opening PO of the pallet P. Then, the air or hydraulic cylinder 107 of the shifting device 102 is actuated to shift the driving device 103 to the left side as viewed in FIG. 15, coupling the hex end of coupling sleeve 115 of the driving device 103 to the hex coupling end 123A of the drive shaft 123 of the working head W3, as well as to bring the connecting pins 110 into engagement with recesses of the gear casing 120 of the working head W3, thereby operationally coupling together the driving device 103 and the working head W3.

After the operational coupling of the driving device 103 and the working head W3, the cylinder 101A of the lifting device 101 is actuated to lift up the lifting device 101 itself, so as to move up the working head W3 along the rails 56" of the swingable frame 35" in order to place it in the working position. A position sensor like the position sensor 78a (see FIG. 5) detects the movement of the working head W3 up to the working position. The nut runner 111 of the driving device 103 is actuated to rotate the output shaft 111A. The rotation of the output shaft 111A of the driving device 103 is transmitted to the rotatable shaft 122 of the working head W3 through the solid rotatable shaft 114 of the driving device 103, the driving shaft 123, the bevel gear 125 and the bevel gear 126 of the working head W3. Through this rotation of the rotatable shaft 122 of the working head W3, the spindle rod 121 with the screw cap receiving member 121A at the top thereof is rotated to fasten the screw cap 100 received in the recess 121B of the screw cap receiving member 121A onto a work, for example, in this embodiment a rear axle assembly AS placed on the pallet P.

Although the present invention has been fully described by way of the preferred embodiments thereof with reference to the accompanying drawings, it should be noted that two different working heads, for example, the working head W1 for staking the lip 15 of the lock nut 14 and the working head W2 for fitting the hub cap 16, may be attached to opposite ends of the swingable frame 35 in order to apply alternately two different workings to a same work placed on the pallet at a sam working station. It should be also noted that two working heads, of the same construction but different in size, may be attached to the swingable frame in order to apply a same working but to different sizes of works mixedly conveyed by the conveyer for the production line.

It will, of course, be understood that various changes and modifications will be apparent to those skilled in the art. Therefore, unless otherwise such changes and modifications depart from the scope of the present invention, they should be construed as included therein.

What is claimed is:

1. A working apparatus for applying a working upon a work from beneath, said work being carried on a pallet conveyed by a conveyer, said working apparatus comprising:
   guide means;
   at least one working head slidably mounted on said guide means for vertical sliding movement between a raised working position for applying a working upon a work on said pallet from beneath and a lowered rest position;
   lifting means disposed beside said working head when in said rest position for lifting said working head from said rest position to said working position; and
   operating means disposed beside said working head when in said rest position and movable horizontally from a withdrawn position to a cooperative position where the operating means cooperates with said working head lifted and placed in said working position for operating said working head to apply a working on said work from beneath.

2. The working apparatus as defined in claim 1, further comprising a frame supporting said guide means, said frame being swingable about a vertical axis to place said working head in and out of said rest position from a remote position.

3. The working apparatus as defined in claim 2, wherein said working head is releasably engaged with said lifting means when at said rest position.

4. The working apparatus as defined in claim 2, wherein said operating means includes a cylinder disposed vertically and a piston rod supported by said cylinder for vertical movement to move up a spindle member of said working head while in said working position, thereby applying said working upon a work on said pallet.

5. A working apparatus as defined in claim 2, wherein said working head comprises a supporting member slidably mounted on said guide means and a spindle member vertically slidably supported by said supporting member, said spindle member being moved up by said operating means to apply said working upon said work while said working head is in said working position.

6. The working apparatus as defined in claim 5, wherein said supporting member of said working head includes at its top nipping means comprising a fixed jaw and a swingable jaw between which a work receiving space is formed, said swingable jaw being swung responsive to a vertical movement of said spindle member to nip and dent partly a work received in said work receiving space.

7. The working apparatus as defined in claim 5, wherein said spindle member includes at its top a work holding member for holding an element of a work fed by a part feeder thereto and for thrusting said element against a work responsive to a vertical movement of said spindle member to fit the element to the work.

8. The working apparatus as defined in claim 1, further comprising a frame having two arms each of which is formed with said guide means, a working head slidably mounted on each guide means, said frame being swingable about a vertical axis to place said working heads alternately one in said rest position and one in the remote position.

9. The working apparatus as defined in claim 8, wherein said working heads are adapted to apply different workings from beneath to the work on the pallet.

10. The working apparatus as defined in claim 8, wherein said working heads apply said working upon different works placed on different pallets.

11. The working apparatus as defined in claim 2, wherein said swingable frame is formed with two said guide means each with a said working head slidably mounted, said swingable frame swinging to place, alternately, said working heads in said rest position.

12. The working apparatus as defined in claim 2, wherein said working head comprises a vertically extending spindle member supported by a casing for rotation and power transmitting means housed in said casing operationally coupled to said vertically extending spindle member, said transmitting means operationally coupled to said operating means in said working position.

13. The working apparatus as defined in claim 12, wherein said transmitting means includes a horizontal shaft supported by said casing for rotation.

14. The working apparatus as defined in claim 13, wherein said transmitting means includes a driving bevel gear fixed to said horizontal shaft and a meshing driven bevel gear fixed to said vertically extending spindle member, said driving and driven bevel gears being disposed at a right angle.

15. The working apparatus as defined in claim 13, wherein said operating means includes a rotatable shaft extending horizontally and rotated by an electric motor, said rotatable shaft being coupled to said horizontal shaft of said power transmitting means of said working head in said working position to rotate said vertically extending spindle member.

16. The working apparatus as defined in claim 13, wherein said operating means is supported by said lifting means for horizontal movement and includes a rotatable shaft that releasably couples to said horizontal shaft of said power transmitting means of said working head in said working position.

17. The working apparatus as defined in claim 13, wherein said vertically extending spindle member of said working head is provided at its top end with a work receiving means for holding a threaded element to be fastened to work placed on the pallet.

* * * * *